US008439071B2

(12) United States Patent
Ekholm

(10) Patent No.: US 8,439,071 B2
(45) Date of Patent: May 14, 2013

(54) SCREEN BASKET VORTEX BREAKER FOR VESSEL

(75) Inventor: Michael Ekholm, Minneapolis, MN (US)

(73) Assignee: Johnson Screens, Inc., Houston, TX (US)

(*) Notice: Subject to any disclaimer, the term of this patent is extended or adjusted under 35 U.S.C. 154(b) by 0 days.

(21) Appl. No.: 13/117,695

(22) Filed: May 27, 2011

(65) Prior Publication Data

US 2012/0298232 A1 Nov. 29, 2012

(51) Int. Cl.
*F16K 51/00* (2006.01)

(52) U.S. Cl.
USPC ............................ 137/590; 137/550; 251/127

(58) Field of Classification Search .................. 137/574, 137/544, 550, 590; 251/127
See application file for complete search history.

(56) References Cited

U.S. PATENT DOCUMENTS 4,127,146 A * 11/1978 Self ............................ 137/625.3
4,696,741 A 9/1987 Rahlwes
4,922,948 A * 5/1990 Van Dijk .................. 137/247.33
5,096,578 A 3/1992 Strickland et al.
5,477,803 A * 12/1995 Moody ......................... 114/316
5,666,987 A * 9/1997 Combs ............................. 137/1
5,790,619 A 8/1998 Peck
6,014,987 A * 1/2000 List et al. ...................... 137/549
6,591,867 B2 * 7/2003 Grayson ....................... 137/590

OTHER PUBLICATIONS

"Monarch's 2 & 3 Phase Separators, Excellence in Production and Process Operations," by Monarch Separators, Inc., obtained from www.monarchseparators.com, 8 pages.
Vortex breakers product page, obtained from http://www.natcogroup.com/ProductPage.asp?ProductID=60&Print=Yes , generated May 21, 2008, 1 page.
"Internals for Down Flow Reactors," by Johnson Screens, Inc., a Weatherford Company; (c) 2006 Johnson Screens HPI-DF01, obtained from www.johnsonscreens.com.
"Innovative Solutions in Screen Technology," by Johnson Screens, a Weatherford Company; obtained from www.johnsonscreens.com, (c) 2006, JS-BR5313-0505 WFT4371.00, 12 pages.

* cited by examiner

*Primary Examiner* — Eric Keasel
*Assistant Examiner* — Angelisa Hicks
(74) *Attorney, Agent, or Firm* — Moore & Van Allen PLLC

(57) ABSTRACT

A vortex breaker fits over an outlet of a vessel. The breaker has a basket disposed on a base with an opening communicating with the vessel's outlet. The basket has a cylindrical sidewall screen with profiled wires arranged around bars that extend from the base. The basket also has a top screen attached to the sidewall screen. The top screen has wires arranged across a plurality of bars. Fluid flow passing through the screens is directed by the profiled wires and the bars. Below the top screen, a baffle plate diverts the fluid flow passing through the top screen to the periphery of the top plate. Inside the basket, a flow modifier has a vanes attached to the base and disposed radially around the base's opening. At least some of the vanes have cross-tees extending from the vane's sides to break the radially directed flow inside the basket.

23 Claims, 7 Drawing Sheets

SCREEN BASKET VORTEX BREAKER FOR VESSEL

BACKGROUND

Fluids exiting a vessel tend to swirl and form a vortex, and it is often desirable to minimize the vortex or swirling flow in the exiting fluid. This is particularly true for liquefied natural gas (LNG) and other similar fluids. One way to reduce vortex and swirling flow is to use a breaker at the outlet of the vessel. For example, a vessel 10 illustrated in FIGS. 1A-1C has a basic vaned vortex breaker 30 to reduce vortex and swirling flow in the vessel's outlet 14. As shown, the breaker 30 has vanes 32 welded to the interior of the vessel's wall 12 over the outlet 14. Here, the breaker 30 has four vanes 32 made from two side plates welded to a lager central plate. As the fluid 20 in the vessel 10 flows toward the outlet 14, the flow 22 naturally tends to swirl and form a vortex. However, the vortex breaker 30 over the outlet's mouth 16 is intended to break this tendency and to reduce its ill effects.

Another vortex breaker 40 illustrated in FIGS. 2A-2D fits over a vessel's outlet 14 to reduce the tendency of vortex and swirling flow in the fluid exiting the vessel 10. This type of vortex breaker 40 is similar to that manufactured by Johnson Screen—a Weatherford company. The breaker 40 has a screen basket 41 that fits over several vanes 50. The screen basket 41 has a flat top 42, a cylindrical sidewall 44, a bottom 46, and an outlet insert 48. Both the flat top 42 and cylindrical sidewall 44 are composed of wire screens that have wedged-shaped or profiled wires commonly used in the fluid industry, such as the VEE-WIRES® available from Johnson Screens. (VEE-WIRE is a registered trademark of Weatherford/Lamb, Inc.). As best shown in FIG. 2D, the vanes 50 fit around a central opening 47 in the breaker's bottom 46, and inner and outer rings 52 and 54 can support the upper corners of the vanes 50. This vortex breaker 40 use a baffle plate under the top screen 42.

The basic vaned vortex breaker 30 of FIGS. 1A-1C and the screen breaker 40 of FIG. 2A-2D may be ineffective in some implementations. For example, the basic vaned vortex breaker 30 of FIGS. 1A-1C can be ineffective in LNG applications because properties of LNG tend to produce turbulent flow and/or small vortexes beyond the breaker's vanes 32, producing ill effects in the outlet 14.

In addition, the screen basket breaker 40 with internal vanes 50 of FIGS. 2A-2D must typically have a significantly large size in comparison to the mouth 16 of the outlet 14 to be effective in breaking vortex flow. In some installations, for example, the breaker 40 may need to have a diameter that is about 4 to 5 times the diameter of the outlet's mouth 16, although the actual size may further depend on the fluid type, flow rates, and other variables. The required larger size for the breaker 40 limits its effectiveness in various sized vessels and even limits its use in some situations altogether.

What is needed is a vortex breaker that is more effective for LNG and other types of fluids and that can have a smaller size than conventionally possible.

DETAILED DESCRIPTION

A vortex breaker fits over a vessel's outlet. The breaker has a wire basket with a sidewall screen and a top screen. The sidewall screen is disposed on a base, and the base has an opening communicating with the vessel's outlet. The basket's sidewall screen has a cylindrical shape with profiled wires horizontally arranged around bars that extend vertically from the base. The basket's top screen is attached to the sidewall screen and has a flat, disc shape. As with the sidewall screen, the top screen has wires arranged perpendicularly across a plurality of bars. In an alternative, the basket's sidewall screen can have a cylindrical shape with profiled wires vertically arranged around bars that extend horizontally.

In use, fluid passing through the top and sidewall screens is directed by the profiled wires and the bars into the basket. Below the top screen, a baffle plate diverts the fluid passing through the top screen to the periphery of the top plate adjacent the sidewall screen. Inside the basket, a flow modifier has vanes attached to the base and disposed radially around the opening in the base. At least some of these vanes have cross-tees extending from the vane's sides to break the radially directed flow in the basket. Preferably, first planar vanes and second cross-teed vanes are arranged symmetrically and alternating around the central opening in the base.

Figure 1A:
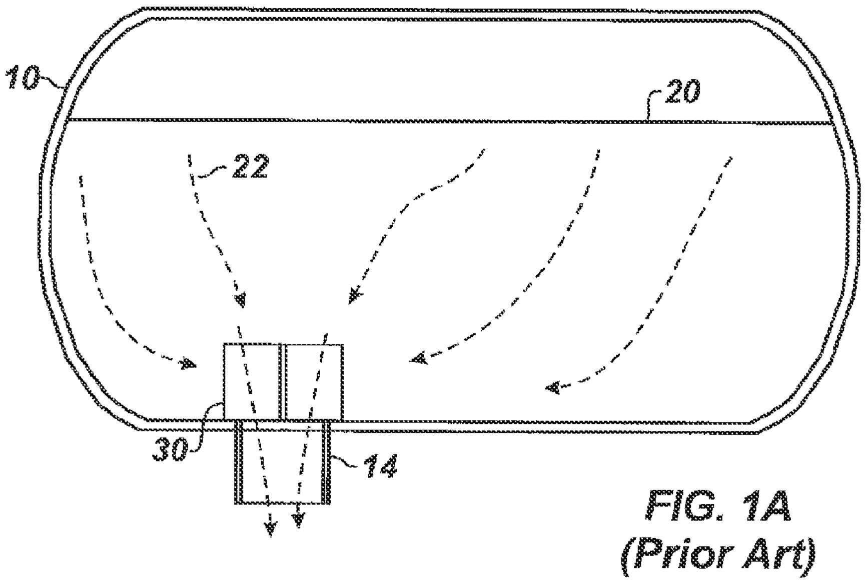
FIG. 1A (Prior Art)
FIG. 1A shows a horizontal vessel having a vortex breaker according to the prior art.
Figure 1B:
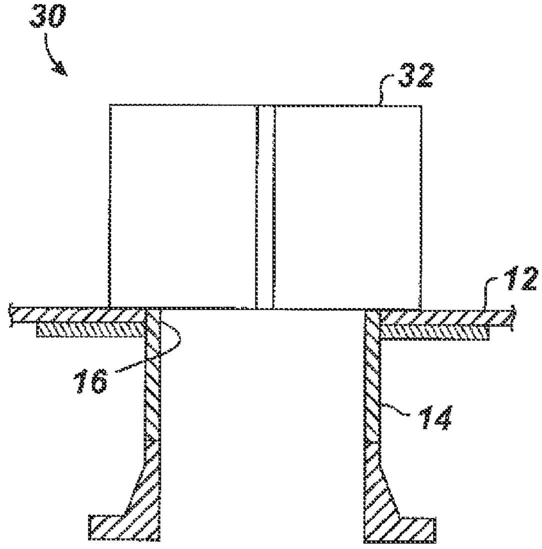
FIG. 1B (Prior Art)
FIGS. 1B-1C show side and top view of the vortex breaker of FIG. 1A.
Figure 1C:
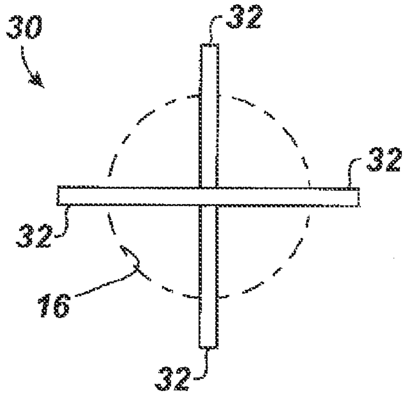
FIG. 1C (Prior Art)
Figure 2A:
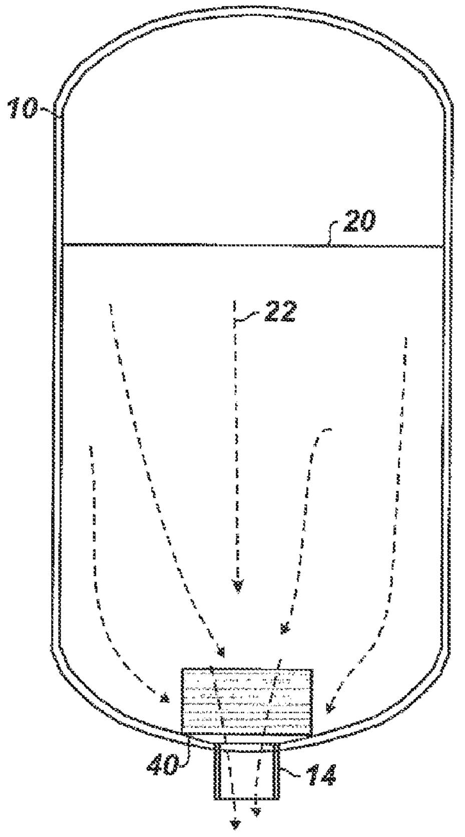
FIG. 2A (Prior Art)
FIG. 2A shows a vertical vessel having another vortex breaker according to the prior art.
Figure 2B:
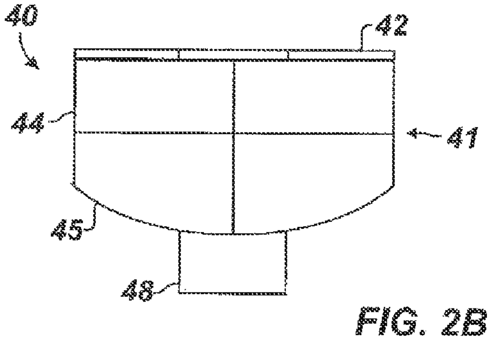
FIG. 2B (Prior Art)
FIGS. 2B-2D show front, side, and detailed perspective views of the vortex breaker of FIG. 2A.
Figure 2C:
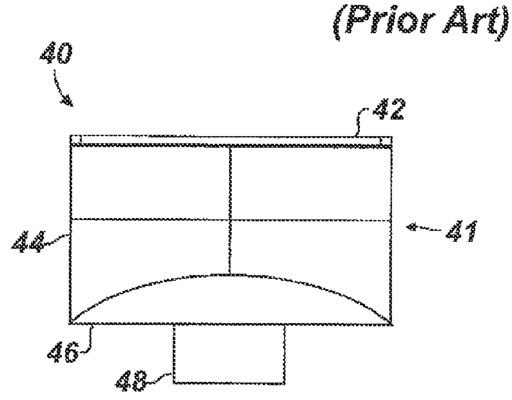
FIG. 2C (Prior Art)
Figure 2D:
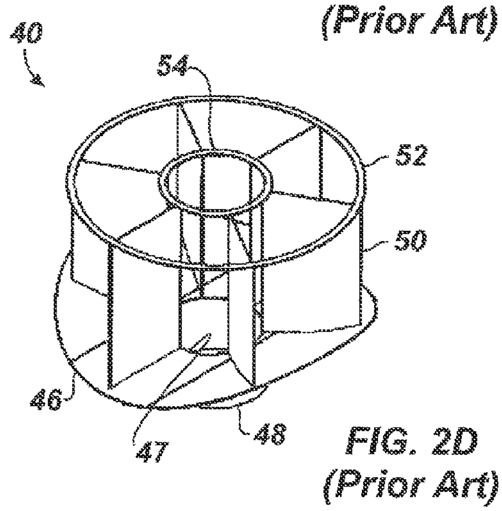
FIG. 2D (Prior Art)
Figure 3A:
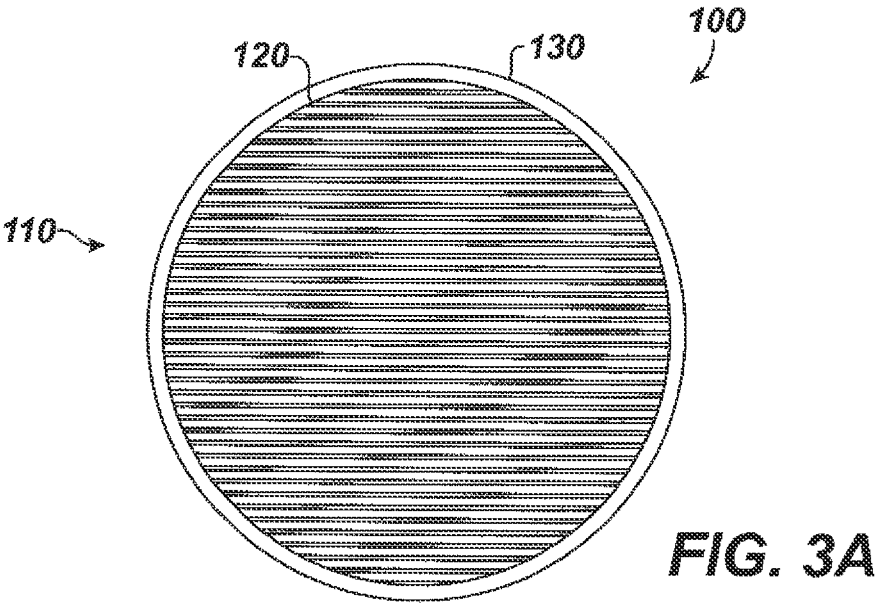
FIGS. 3A-3B show top and side views of a vortex breaker according to the present disclosure.
Figure 3B:
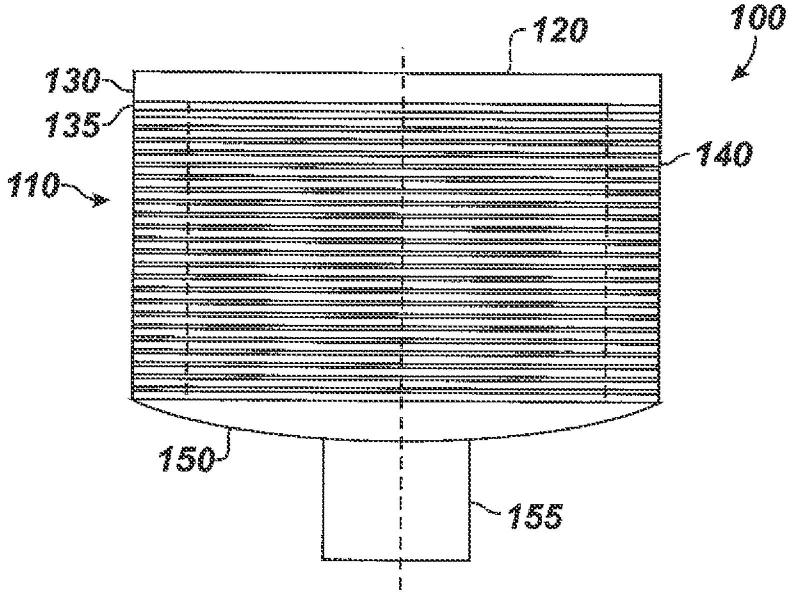

Turning to the drawings, a vortex breaker 100 illustrated in FIGS. 3A-3B installs over the outlet of a vessel (not shown), which can be vertical or horizontal. The breaker 100 has a screen basket 110 having a top screen 120 and a sidewall screen 140. The top screen 120 is disc shaped and positions atop the sidewall screen 140. A banding 130 and a rim 135 surround the top screen 120 and attach it to the sidewall screen 140. For its part, the sidewall screen 140 is cylindrically shaped and is supported on a base 150. An outlet insert 155 extends from the base 150 for positioning in a vessel's outlet (e.g., 12; FIG. 1A or 2A).

Both the top and sidewall screens 120 can be constructed from several modular screen components coupled together. For example, the top screen 120 can be formed from two or more panels coupled together. In a similar fashion, the sidewall screen 140 can be formed from several screen panels or quadrants that couple together to form the screen's cylindrical shape. Because the vessel in which the basket 110 may position may have a curved inner sidewall, the screen 140's lower edges can be contoured to conform to the shape of the vessel. In addition, the basket's base 150 can be shaped to fit against the vessel's inner wall.

Figure 4A:
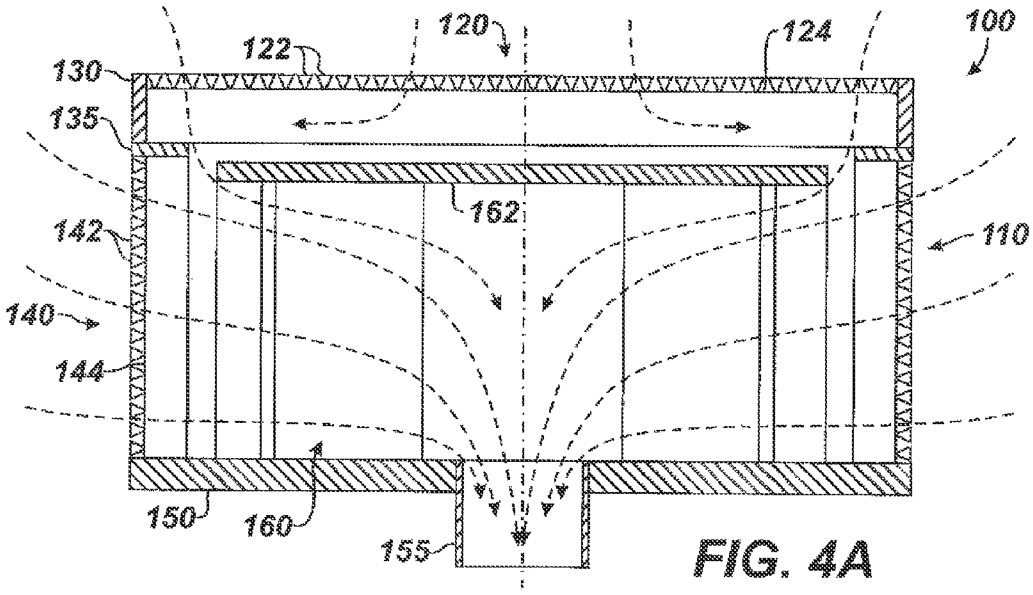
FIGS. 4A-4B show top and side views of exposed portions of the vortex breaker of FIGS. 3A-3B revealing additional components.

As best shown in FIG. 4A, the sidewall screen 140 has a plurality of horizontally oriented wires 142 attached to and wrapped around a plurality of vertically oriented rods or bars 144. These wires 142 are wedge-shaped or profiled wires, such as VEE-WIRES® known and used in the art for various purposes. The bars 144 weld or attached to the base 150, and the wires 142 weld to the bars 144 using techniques known in the art. The wires 142 may have their wider sides disposed outwardly around the circumference of the sidewall screen 140 and may have their thinner sides welded to the bars 144. In this way, the wires 142 define gaps or slots between them that form an initial barrier for fluid flow to the vessel's outlet.

As also best shown in FIG. 4A, the top screen 120 is similarly constructed of a plurality of wires 122 that weld to perpendicularly arranged bars 124 in a similar fashion. These bars 124 connect at their ends to the surrounding banding 130. In turn, the banding 130 attaches to the rim 135 that affixes atop the cylindrical sidewall screen 140.

A baffle plate 162 positions below the top screen 120, and its peripheral edge almost extends to the surrounding sidewall screen 140. The baffle plate 162 may be set directly underneath and optionally attached to the top screen's bars 124. Alternatively, a gap or space can be provided between the baffle plate 162 and bars 124. In any event, being under the screen's wires 122 and rods 125, the baffle plate 162 diverts flow passing through the top screen 120 to the plate's peripheral edge. From this peripheral edge, the diverted flow can then be directed inside the basket 110 to the outlet insert 155.

Figure 4B:
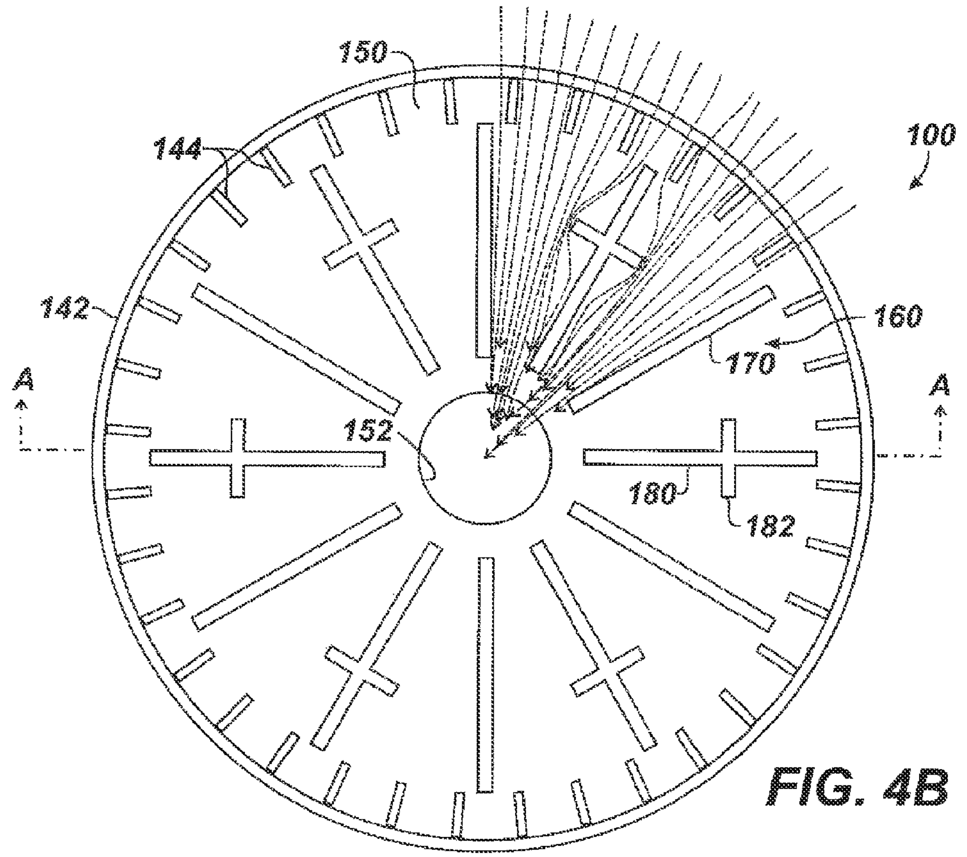

In addition to the screen basket 110, the breaker 100 has a flow modifier 160 positioned within the basket 110, as shown in detail in FIGS. 4A-4B. The flow modifier 160 positions on the base 150 inside the basket 110 and includes first and second vanes 170/180 radially oriented from the center of the basket 110. These vanes 170/180 can be attached or welded to the surface of the base 150 using techniques known in the art. As best shown in FIG. 4B, the first and second vanes 170 and 180 of the flow modifier 160 are alternatingly and symmetrically arranged around the base's central opening 152.

The first vanes 170 include planar, solid plates oriented radially from the base's central opening 152. The second vanes 180 also include planar, solid plates but have cross-tees 182 positioned perpendicularly thereto. These cross-tees 182 are intended to break radially directed flow. The locations and sizes of these cross-tees 182 depend on the fluid type, flow velocity, flow characteristics, number of vanes, size of the breaker, and other variables evident to those skilled in the art.

In use, the basket's wire screens 120/140 act as an initial barrier to fluid flow into the breaker 100 and operate to break the tendency of the flow to form vortices and swirls as the fluid passes through the screens 120/140 to the outlet insert 155 disposed in the vessel's outlet. The lengthwise bars 124/144 running perpendicular to the wires 122/142 on the inside of the basket 110 also act to control the flow into the basket 110. Internally, the vanes 170/180 of the flow modifier 160 help radially direct flow in the basket 110 toward the outlet insert 155, and the cross-tees 182 break the radially directed flow in a way that enables the entire breaker 100 to be reduced in overall size. As noted previously, prior art breakers may need a diameter that is about 4 to 5 times the outlet's diameter. The breaker 100 can be about 1.5 to 3 times the outlet's diameter, although the value depends on the outlet size, flow rate and height of fluid in the vessel during service.

The breaker 100 preferably prevents vortices with a minimum effect on flow-through resistance or pressure drop. Together, the combination of flow modifier 160 and screen basket 110 create a pressure and streamline pattern that prevent the formation of vortices. Moreover, the screen basket 110 and flow modifier 160 combination can effectively reduce vortices while requiring a smaller sized basket than conventionally used.

Figure 5A:
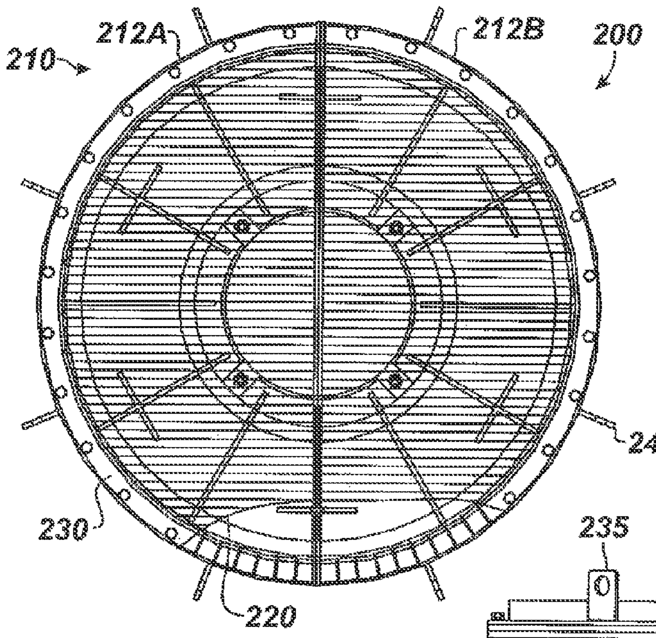
FIG. 5A shows a top view of another vortex breaker according to the present disclosure.
Figure 5B:
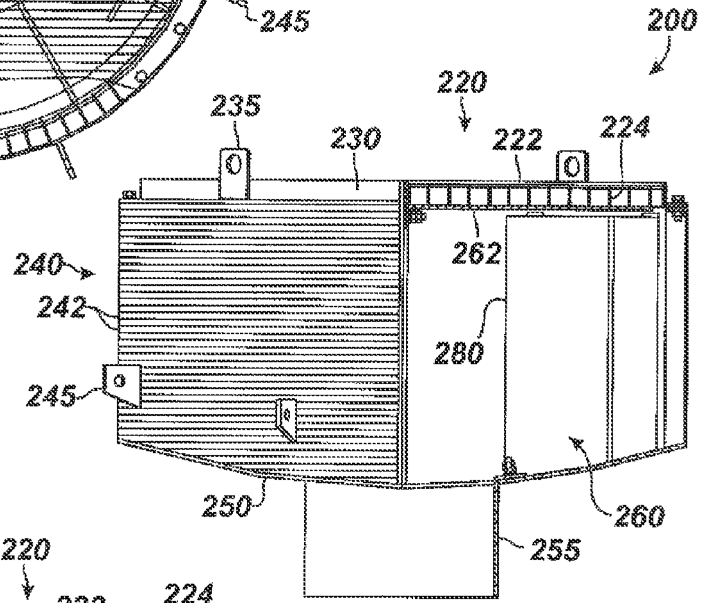
FIG. 5B shows a side view with partial cutaway of the vortex breaker of FIG. 5A.
Figure 5C:
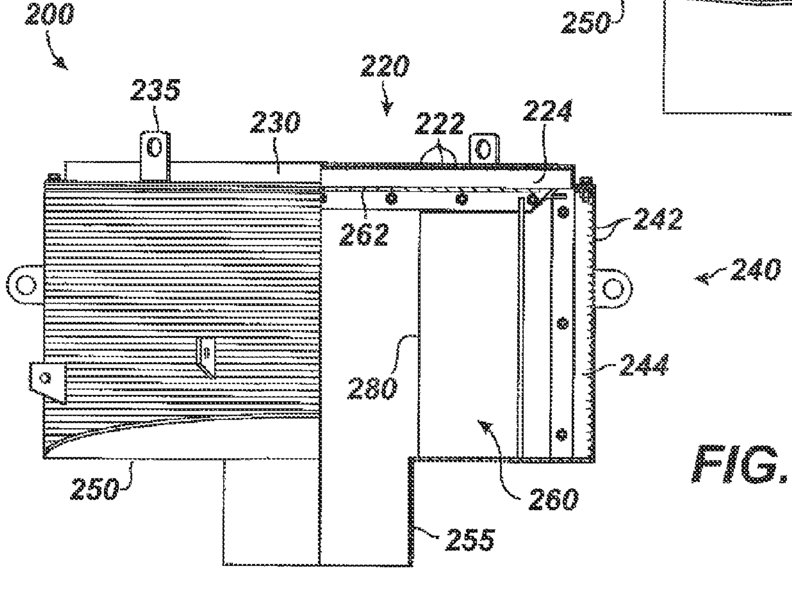
FIG. 5C shows an end view with partial cutaway of the vortex breaker of FIG. 5A.

Another vortex breaker 200 illustrated in FIGS. 5A-5C is similar to the previously described breaker. The breaker 200 has a basket 210 with a top screen 220, a banding 230, a sidewall screen 240, a bottom plate 250, and an outlet insert 255. Hold down clips 245 attached around the sides of the breaker 200 connect to tabs (not shown) welded to the inside of a vessel to hold the basket 210 therein.

The breaker's top screen 220 is surrounded by the banding 230 that attaches the stop screen 220 to the sidewall screen 240. The top screen 220 has wires 222 welded to perpendicularly oriented bars 224 that run across the top screen 220. Below the top screen 220, a baffle plate 262 positions underneath the top bars 224, which can be welded thereto, and covers most of the top screen 220 except for the outer periphery near the banding 230.

The sidewall screen 240 of the basket 210 has horizontally oriented wires 242 wrapped around and welded to vertically oriented bars 244. These bars 244 extend from the base 250 and can be welded or affixed thereto in ways known in the art. The outlet insert 255 is a cylindrical tube extending from a central opening in this base 250 for passage of fluid out of the basket 210. As an alternative to the present arrangement of wires 242 and bars 244, the basket's sidewall screen 240 can have profiled wires 242 horizontally arranged around bars 244 that extend vertically from the base.

As at least partially visible in FIGS. 5A-5C, the basket 210 encloses a flow modifier 260 having a plurality of vanes 270/280 disposed inside the breaker 200. The flow modifier's vanes 270/280 surround the central opening to the outlet insert 255 and extend radially outward to the surrounding sidewall screen 240. Some of the vanes 280 have cross-tees 282 to break the radially directed flow. Further details of the flow modifier 260 are provided below.

Figure 6:
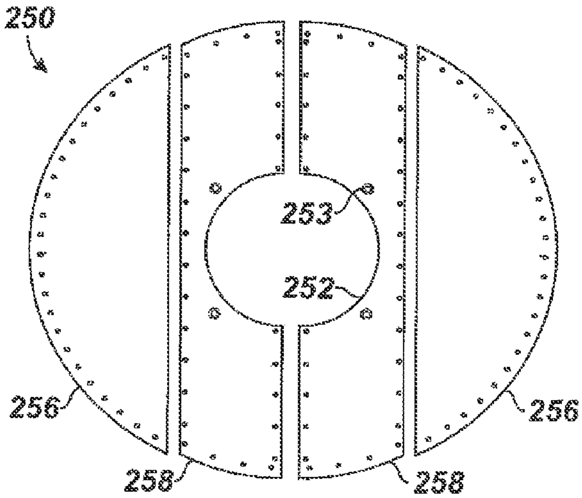
FIG. 6 shows the base of the vortex breaker as unassembled.

This breaker 200 also has a modular construction. For example, the screen basket 210 has first and second halves 212A-B that attach together at the outlet of a vessel (not shown). For example, both the top screen 220 and the banding 230 having semi-circular portions that connect together to form the disc shape screen 220 and banding 230. As shown in FIG. 6, the base plate 250 is made of separate components that attach together. These components include central members 258 that connect together and form the plate's central opening 252. End members 256 attach on either side of these central members 258 and can be bent upward to conform to the inside surface of the vessel.

Figure 7A:
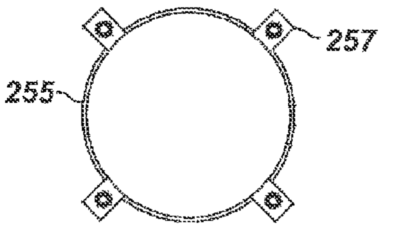
FIGS. 7A-7B show a top view and side cross-section of the vortex breaker's outlet insert.
Figure 7B:
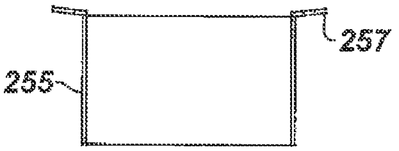

As shown in FIGS. 7A-7B, the outlet insert 255 is a separate cylindrical component having lugs 257. The outlet insert 255 fits through the base plate's central opening (252; FIG. 6) so it can extend below the base 250. The insert's lugs 257 attach to upward extending bolts (253; FIG. 6) welded to the base plate (250; FIG. 6), although other attachment techniques could be used.

Figure 8:
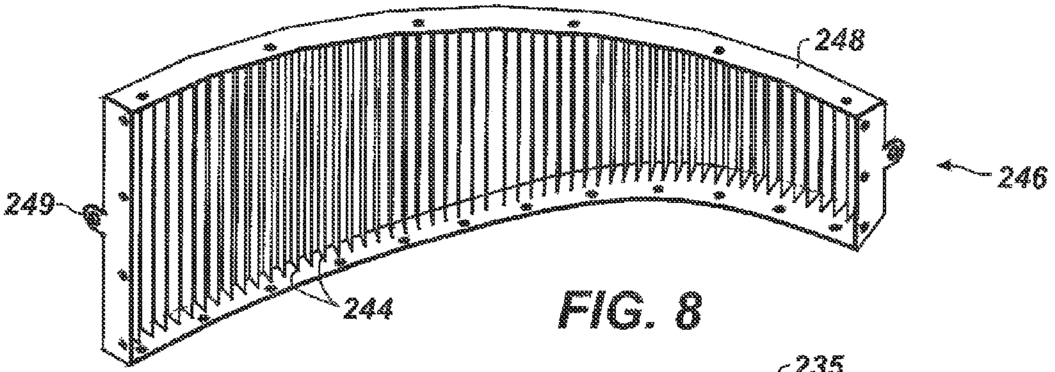
FIG. 8 shows a quarter panel of the vortex breaker's sidewall.

As shown in FIG. 8, the sidewall screen 240 of the breaker 200 can be modular and can be composed of quarter panels 246. Each of the quarter panels 246 has a surrounding frame 248 to which ends of the vertically oriented bars 244 weld. Four such quarter panels 246 bolt end to end to form the cylindrical screen 210, and the lower edges of the frame 248 bolt to the periphery of the base plate (250; FIG. 6).

Figure 9A:
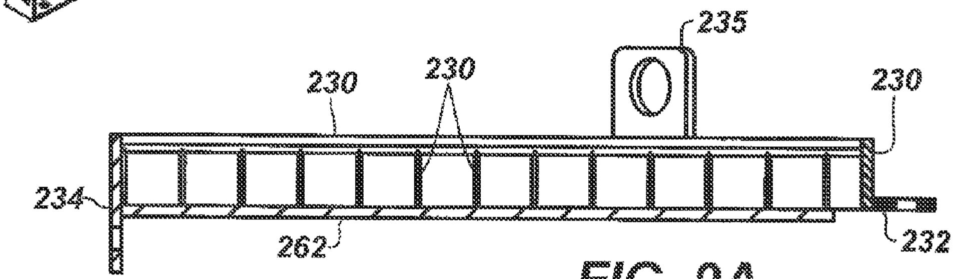
FIGS. 9A-9B show cross-sections of the vortex breaker's top screen, banding, and other components.
Figure 9B:
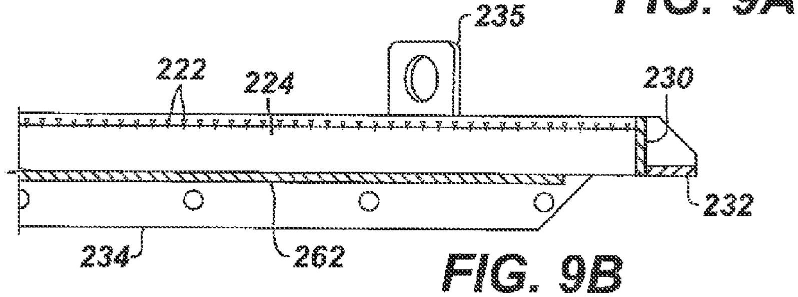

As shown in FIGS. 9A-9B, the banding 230 has a bolting flange 232 that bolts to the top edges of the quarter panel's frame (248; FIG. 8). As best shown in FIG. 9A, the top screen's half disc 220A has a joint flange 234 that bolts to the other complementary half disc of the top screen. (See e.g., FIG. 5B). As visible in FIG. 5C, the joint flanges 234 couple together near the vanes 280. Therefore, these vanes 280 near the flanges 234 can have a cutaway profile 284 along the top edge to accommodate the shape of the joint flanges 234, but the cross-tees 282 may extend upward beyond the flanges 234.

Figure 10:
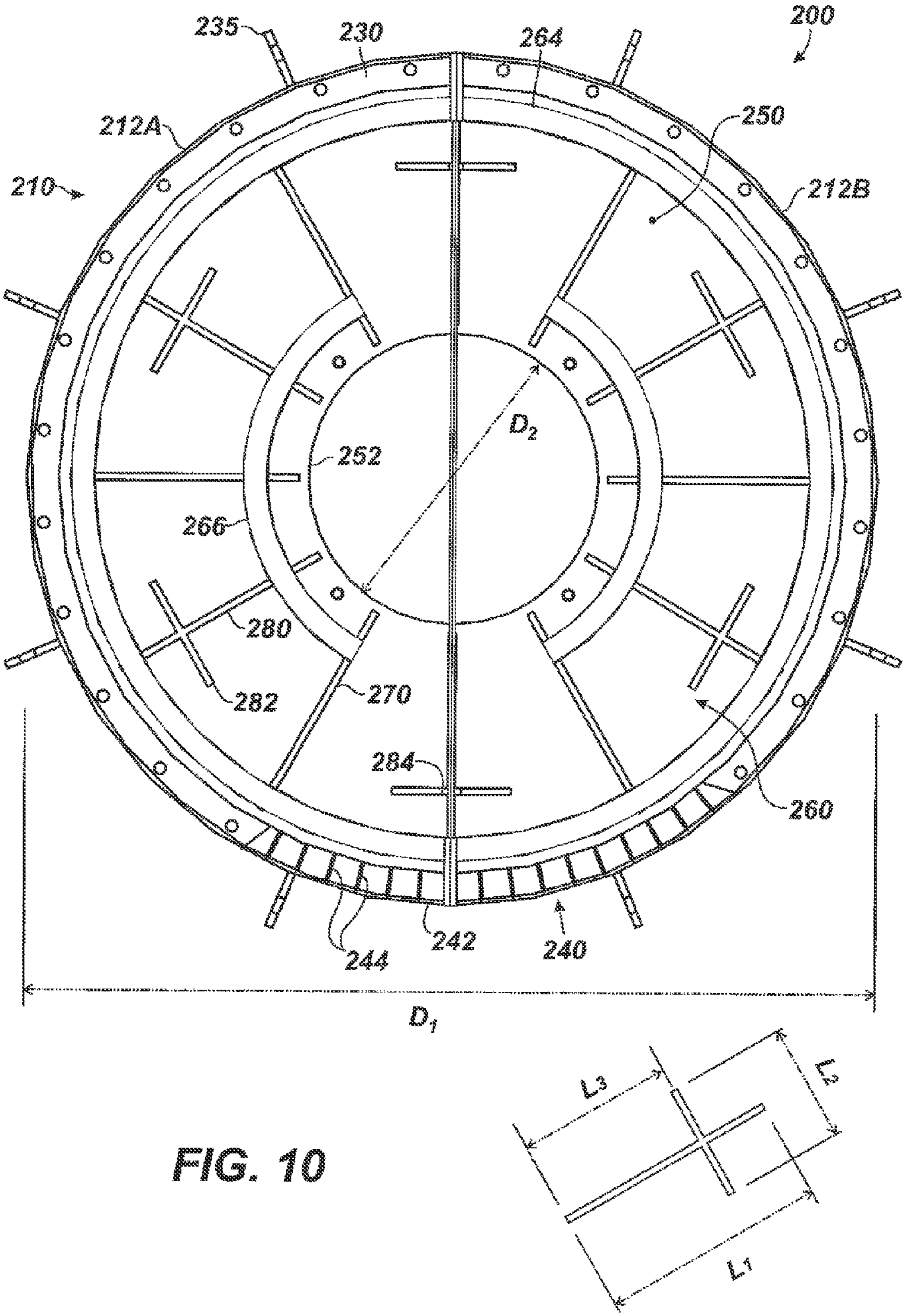
FIG. 10 shows an exposed top view of the vortex breaker of FIG. 5A revealing the flow modifier therein.

The vortex breaker 200 uses the flow modifier 260 and directs flow in a similar manner to that discussed above with reference to FIGS. 3A-4B. As best shown in the exposed top view of FIG. 10, the inside of the basket 210 has the flow modifier 260 positioned on the base plate 250 around the central opening 252 communicating with the outlet. The flow modifier's vanes 270 and 280 are arranged symmetrically and alternatingly around the base plate 250's central opening 252. In the present example, there are twelve vanes 270/280 (six of each) that are arranged at every 30 degrees around the central opening 252, although other arrangements can be used depending on the implementation.

The first vanes 270 include planar, solid walls oriented radially from the central opening 252. These vanes 270 extend from the central opening 252 radially outward to a point almost to the vertically oriented bars 244 of the sidewall 240. The second vanes 280 also include planar, solid walls that are similarly oriented radially from the central opening 252. These vanes 280 also extend from the central opening 252 radially outward to a point almost to the vertically oriented bars 244 of the sidewall 240.

The second vanes 280 also have cross-tees 282 positioned perpendicularly thereto. As shown, these cross-tees 282 may be positioned relatively closer to the surrounding sidewall 240 as opposed to the central opening 252. Likewise, these cross-tees 282 can encompass half or less than half of the distance d between the second vane 280 and the adjacent first vanes 270. For support, semicircular stabilizer bands 264 can attach to outer top corners of the vanes 270/280 near the basket 210's periphery, and curved stabilizer bands 266 can attach to inner corners of the vanes 270 and 280 near the basket 210's center.

The size, placement, and shape of the vanes 270/280 and cross-tees 282 can be determined based on rules of thumb, equations, guidelines, and other considerations available to one skilled in the art. To determine the expected shape of the free flow vortex, for example, formulas can first be used for estimation, and then computation fluid dynamic (CFD) models can be used. The breaker 200 is then sized to be large enough to disrupt the shape of the vortex. Sizing ratios for the breaker 200 relative to the size of the vortex that have proven to be successful in previous installations can then be used to finalize the size for the vortex breaker 200. These ratios can vary based on the nozzle size and vessel orientation (horizontal or vertical vessels).

For further refinement, CFD models are used to determine the streamline pattern for the vessel geometry and nozzle configuration during expected operation. The vortex breaker 200 is then added to the CFD model to determine its effects on the streamlines. If the breaker 200 removes the turbulent or swirling streamlines in the CFD model, then the current design of the breaker 200 may be deemed acceptable. If the breaker 200 does not remove the turbulent or swirling streamlines, then the size, number, location and other general configuration variables of the vanes, screen, and other components are altered until the desired flow control effect is observed.

For illustrative dimensions, the basket 210 may have an overall diameter $D_1$ of about 737-mm, and the central opening 252 for the outlet may have a diameter $D_2$ of about 251-mm. The planar portions of the vanes 270/280 may have a length $L_1$ of about 197-mm. The cross-tees 282 may have an expanse $L_2$ of about 102-mm and may be positioned at a distance $L_3$ about 133.5-mm from the inner edge of the vanes 280. For additional illustration, the slot width between the sidewall's wires (242; FIGS. 5A-5C) may be about 6.35-mm, and the slot width between the top screen's wires (222; FIGS. 5A-5C) may be about 4.76-mm The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A vortex prevention apparatus, comprising:
- a screen basket disposing in a vessel for enclosing an outlet of the vessel; and
- a flow modifier disposed within the basket adjacent the outlet, the flow modifier at least including a plurality of first and second vanes disposed radially around the outlet and being alternatingly arranged around the outlet, the first vanes being first planar plates having first planar sides and having cross-tees extending from both of the first planar sides, the second vanes being second planar plates having second planar sides and lacking the cross-tees on the second planar sides.

2. The apparatus of claim 1, wherein each of the first and second vanes comprises
- a first end positioned adjacent the outlet,
- a second end positioned adjacent a sidewall of the screen basket,
- a first edge affixed to a base of the screen basket, and
- a second edge positioned adjacent a top of the screen basket.

3. The apparatus of claim 1, wherein the cross-tees are disposed on the first vanes at a first distance from a sidewall of the screen basket that is less than a second distance from the outlet.

4. The apparatus of claim 1, wherein the cross-tees extend from both the first planar sides of the first planar plates by a first distance that is less than half of a second distance between the adjacent first and second vanes.

5. The apparatus of claim 1, wherein the flow modifier comprises at least one stabilizer affixed to top edges of at least some of the first and second vanes.

6. The apparatus of claim 1, wherein the basket comprises:
- a base having an opening communicating with the outlet;
- a sidewall screen having a plurality of first wires arranged around a plurality of first bars extending from the base; and
- a top screen positioned on the sidewall screen and having a plurality of second wires arranged across a plurality of second bars.

7. The apparatus of claim 6, further comprising a baffle plate disposed between the top screen and the flow modifier, the baffle plate restricting fluid flow passing through the top screen to a peripheral edge of the baffle plate adjacent the sidewall screen.

8. The apparatus of claim 6, wherein each of the first wires comprises a profiled wire having a wider side exposed outside the basket and having a narrower side welded to the first bars.

9. The apparatus of claim 6, wherein each of the second bars has ends affixed to a surrounding band.

10. The apparatus of claim 9, wherein the surrounding band is affixed to the sidewall screen.

11. The apparatus of claim 6, wherein the sidewall screen comprises a plurality of modular panels connected together.

12. A vortex prevention apparatus, comprising:

a base disposing in a vessel adjacent an outlet and having an opening communicating with the outlet;

a basket disposed on the base, the basket at least including a sidewall screen having a plurality of first wires arranged around a plurality of first bars extending from the base, and a top screen disposed on the sidewall screen and having a plurality of second wires arranged across a plurality of second bars; and a flow modifier disposed within the basket, the flow modifier at least including a plurality of first and second vanes extending from the base, the first and second vanes disposed radially around the opening in the base and being alternatingly arranged around the opening, the first vanes being first planar plates having first planar sides and having cross-tees extending from both of the first planar sides the second vanes being second planar plates having second planar sides and lacking the cross-tees on the second planar sides.

13. A vessel, comprising:

a shell defining a hollow and having an outlet;

a screen basket disposed in the hollow of the shell and enclosing the outlet; and a flow modifier disposed within the basket, the flow modifier at least including a plurality of vanes disposed radially around the outlet and being alternatingly arranged around the outlet, the first vanes beinq first planar plates having first planar sides and having cross-tees extending from both of the first planar sides, the second vanes being second planar plates having second planar sides and lacking the cross-tees on the second planar sides.

14. The apparatus of claim 13, wherein each of the first and second vanes comprises a first end positioned adjacent the outlet, a second end positioned adjacent a sidewall of the screen basket, a first edge affixed to a base of the screen basket, and a second edge positioned adjacent a top of the screen basket.

15. The apparatus of claim 13, wherein the cross-tees are disposed on the first vanes at a first distance from a sidewall of the screen basket that is less than a second distance from the outlet.

16. The apparatus of claim 13, wherein the cross-tees extend from both the first planar sides of the first planar plates by a first distance that is less than half of a second distance between the adjacent first and second vanes.

17. The apparatus of claim 13, wherein the flow modifier comprises at least one stabilizer affixed to top edges of at least some of the first and second vanes.

18. The apparatus of claim 13, wherein the basket comprises:

a base having an opening communicating with the outlet;

a sidewall screen having a plurality of first wires arranged around a plurality of first bars extending from the base; and a top screen positioned on the sidewall screen and having a plurality of second wires arranged across a plurality of second bars.

19. The apparatus of claim 18, further comprising a baffle plate disposed between the top screen and the flow modifier, the baffle plate restricting fluid flow passing through the top screen to a peripheral edge of the baffle plate adjacent the sidewall screen.

20. The apparatus of claim 18, wherein each of the first wires comprises a profiled wire having a wider side exposed outside the basket and having a narrower side welded to the first bars.

21. The apparatus of claim 18, wherein each of the second bars has ends affixed to a surrounding band.

22. The apparatus of claim 21, wherein the surrounding band is affixed to the sidewall screen.

23. The apparatus of claim 18, wherein the sidewall screen comprises a plurality of modular panels connected together.

* * * * *